April 27, 1937.  K. H. MEIER  2,078,768
METHOD OF AND APPARATUS FOR MEASURING THE ENERGY OF RAYS
Filed March 17, 1934
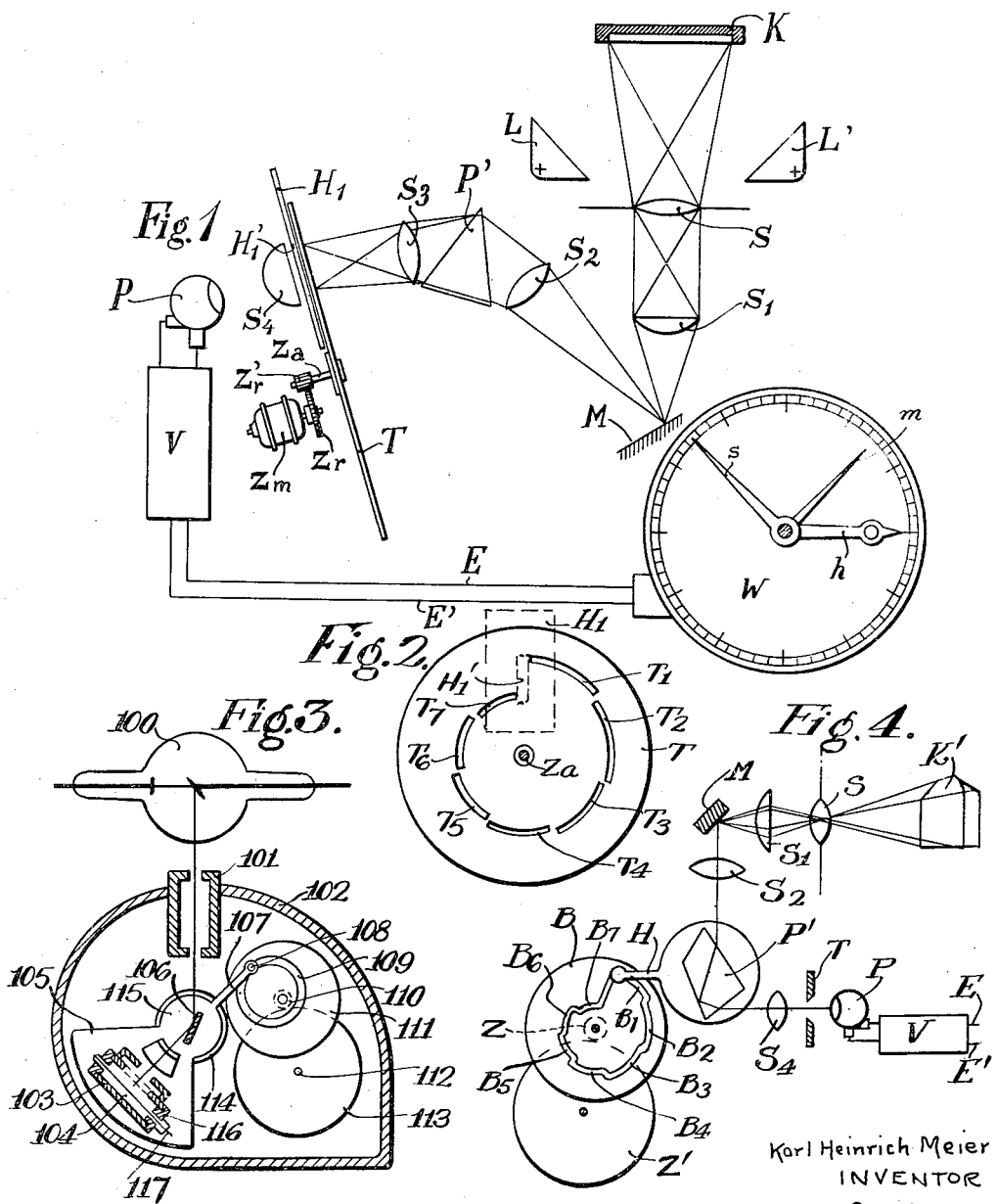
Karl Heinrich Meier
INVENTOR Patented Apr. 27, 1937

2,078,768

UNITED STATES PATENT OFFICE 2,078,768

METHOD OF AND APPARATUS FOR MEASURING THE ENERGY OF RAYS

Karl Heinrich Meier, Zurich, Switzerland, assignor to Emil Huber, Zurich, Switzerland Application March 17, 1934, Serial No. 716,100
In Switzerland March 31, 1933

14 Claims. (Cl. 88—14)

This invention relates to a method of and apparatus for measuring and, if desired, for registering the energy of rays.

If it is desired for example to ascertain the necessary exposure period for photographically taking a particular scene, and if, further, the sensitivity of a light sensitive emulsion is known, it is nevertheless not possible to determine accurately the required exposure period if the momentary intensity of the source of light is ascertained by means of photometer, for variations in this source of light, particularly in the case of artificial lighting, may occur immediately after the above-mentioned measurement has been taken. If on the other hand the exposure period required for the taking of a particular scene is known for a particular source of illumination, for example an electric lamp, then if other kinds of illumination are used, for example daylight or gaslight, tedious calculations and photometric measurements are necessary in order to convert the conditions determined for one particular kind of illumination into the conditions required for other sources of light.

As a rule use is made, by photographers and in optical multiple reproducing plants when carrying out photographic reproductions, of electrically operated illuminating apparatus such as incandescent or arc lamps. The variations in the intensity of the light source which are due principally to fluctuations in the working voltage, produce great uncertainty in determining the exposure period for photographing a scene. It is true that a variety of devices are already known to compensate for these variations in brightness, but too much reliance must not be placed upon these devices. Such devices are found to be particularly inadequate where the spectral composition of the light source varies. Such variations in the light source may occur, if, for example, the carbons of the arc lamp are changed because, generally speaking, the spectral composition and the light yield is determined by the metal cores which are introduced into these carbons. A further objection is that as a rule the illuminating lamps are hung on travelling rails. Tremors in the building and currents of air in the exposure room produce an oscillation of the suspended illuminating body whereby the distance of the illuminating body from the object which is being photographed is varied in rhythm with the swinging of the lamp. If these lamp oscillations occur there is produced a variation in the quantity of light falling on the scene even though there is no variation in intensity of the light given off by the illuminating lamp.

If the radiation emitted by a light source is measured simply my means of photo-currents released by light falling upon a photoelectric device, it will be found that such a device is not suitable for the end in view because every photo cell has a sensitivity varying with the particular wave length of the light falling on it. If, for example, a potassium cell is used, the blue portion of the radiation is particularly emphasized and the red portion of the light band is not brought out. If by means of such an apparatus, two light sources which differ in their spectral compositions are compared with one another, a greater photo-current is released in the photo-cell for that source of radiation whose light consists mainly of blue rays, than for a source of radiation which contains little or no blue light. A measuring device of this kind could accordingly not be used for determining the exposure period of a photographic emulsion, because the spectrol sensitivity of the emulsion is within the range of a wave length of the light band which differs from that of the photo-cell.

For example the quantity of radiation absorbed by the human body from a mixture of X-rays cannot be directly indicated by present-day methods. The determination of the intensity of a Röntgen ray generator is usually effected by means of a milliampere meter which is inserted in the cathode lead of the Röntgen tube. The investigation of the quantity of radiation which is absorbed by the body is further made extraordinarily difficult by the variations in absorption of the cellular skin tissue. With persons having a thick covering of fat more radiation energy is absorbed through the skin than with thin persons.

According to the present invention the method of measuring the radiation energy absorbed by an irradiated body can be carried out by dispersing the radiation and adding together the resulting partial currents of the radiation given off directly by the radiation source and the radiation which leaves the absorbing body, ascertaining the absorbed radiation energy from the difference between these two totals. In this way it is possible, if for example, one is concerned with measuring the Röntgen radiation absorbed by the human body, to avoid overdoses with certainty.

In the accompanying drawing there is illustrated, by way of example, several forms of apparatus for carrying out the method according to the present invention.

Fig. 1 shows diagrammatically a construction with an optical dispersion device.

Fig. 2 shows a detail of this construction.

Fig. 3 shows a construction by way of example, of a monochromator for X-rays.

Fig. 4 shows a construction of a monochromator for visible rays.

The scene or image which is mounted stretched in the copying frame K (Fig. 1) is illuminated by the lamps L, L'. The light reflected from the scene passes through the collecting lens S and the condenser $S_1$ and falls upon the magnesite block M which is arranged obliquely to the direction of the beam. This magnesite block is intended to prevent the light from reaching the photo-cell which, during the measuring operation, falls directly, that is to say without reflection, upon the lens S. The beam reflected from the magnesite block passes through the lens $S_2$ and falls upon a dispersion device P' which is in the form of a prism or diffraction grating. The light beam is thus dispersed so that an extended spectrum is formed. This spectrum passes through the lens $S_3$ and falls upon the disc T which is mounted on the shaft $Za$, rapidly rotated by a motor $Zm$ by means of gearing $Zr$, $Z'r$. The disc T contains a number, for example, (corresponding to the colours of the spectrum) seven arcuate slots $T_1$—$T_7$ (Fig. 2) which lie on different radii of the disc and have different widths and different lengths. Individual points of the elongated spectrum pass through the slots $T_1$—$T_7$, through a rectangular slit $H_1'$ in a stationary slit-plate $H_1$ and through a cylindrical collecting lens $S_4$ and fall on the photo-cell P. By this means, owing to the rapid rotation of the disc T the different colour rays of the dispersed light pass through the slots $T_1$—$T_7$ in turn and in rapid succession and fall upon the photo-cell P. In this photo-cell there is released a photo-current corresponding to the intensity of the individual points of the spectrum. This current, after subsequent amplification in the diagrammatically indicated amplifier V, is led by leads E, E' to the recording mechanism W.

This recording mechanism consists of a transmission mechanism which is not illustrated and of a scale in the form of a dial in front of which travel pointers $s$, $m$, $h$, driven by a common gearing. The recording mechanism indicates the total quantity of radiation energy acting upon the radiation sensitive device in a given time.

By means of the apparatus illustrated and described it is possible to measure or register the total radiation energy which during a given time passes from the lamps L and L' to the scene or picture K. By suitably forming and arranging the slots $T_1$—$T_7$ in the disc T or by using suitable filters, shutters or the like on, or acting in conjunction with, the slotted plate $H_1$, it is also possible to ascertain the radiation of only one particular wave length falling during the measuring period upon the scene K, or of a number of particular wave lengths. By suitably selecting the arc lengths of the slots $T_1$—$T_7$ in the disc T it is also possible to allow the partial emission of different wave lengths to act for different periods upon the photo-cell, so that for example the sum of the partial intensities of the radiation is indicated directly in accordance with any particular effect produced by them, such as the blackening of a light sensitive layer or the like, or the selective sensitivity of the photo-cell for particular wave lengths may be compensated.

In the monochromator illustrated in Fig. 3 for X-rays, use is made of the turning-crystal method for spectroscopic analysis of the mixture of X-rays.

The bundle of rays issuing from the anticathode of the Röntgen tube 100 is confined by the slot device 101 to a narrow bundle. This bundle of rays falls upon the crystal 106 which may for example be a rock salt crystal, and is there reflected. This crystal is arranged upon the table 115 which may be oscillated about the support 114. This table, which carries on an extension 105 the ionization chamber 104, is slowly rocked to and fro through a given angle during the illumination period, by means of a guide 108 on the arm 107 running in a groove 109 of the wheel 111. The rotation of the wheel 111 is effected by the drive of the wheel 113 which engages the pinion 110. This drive is effected by means of a motor or clockwork which is not illustrated in the drawing and it rotates the wheel 113 with uniform velocity. During the rotations of the crystal table all the rays contained in the bundle of rays are successively brought to bear on the crystal at an angle corresponding to each particular wave length, and they are separated out into a spectrum on the path of rocking of the table. The waves of the bundle of rays which are reflected by the crystal meet the ionization chamber carried on the crystal turntable. This ionization chamber, which is filled with a suitable gas, consists of a metal cylinder provided with a window, in which cylinder is stretched co-axially the metal wire 117. The chamber is closed on the outside by two insulating flanges. The terminals 116 and 117 of the ionization chamber are connected with the amplifier system of the registering mechanism in such manner that the condenser lying in the grid circuit of an amplifying valve is connected in parallel with the ionization chamber. The ionization chamber constitutes a resistance which varies with the illumination and discharges the condenser. A constructional example of such an amplifier device has already been described with reference to Fig. 2.

Here also, it is possible, by replacing the circular groove 109 by a correspondingly shaped curved groove, to allow the rays of different wave lengths to fall for different periods upon the ionization chamber 104, for example, in such manner that the partial intensities of the radiation are indicated depending on particular effects produced by them, for example, depending on their action upon the cellular structure.

Fig. 4 illustrates diagrammatically the manner of operation of the measuring device for determining the radiation energy reflected by an irradiated body.

The rays reflected from the irradiated body K' are imaged by the collecting lens S upon the front surface of the condenser $S_1$. This condenser collects the incident rays to a focus upon the magnesite block M arranged obliquely to the direction of the rays. The ray reflected from the magnesite block passes through the lens $S_2$ and reaches the Straubel prism P' which splits up this light ray into its several spectra. This prism is arranged upon a turntable which can be oscillated by the arm H. The arm H carries at its end a freely mounted roller which slides in a curved groove in the disc B. This groove has seven parts $B_1$—$B_7$ of different arc lengths which are formed of circular sections concentric with the axis of the disc but lying on different radii of the disc B and interconnected through runways. The disc B is uniformly rotated by the pinion Z and the toothed wheel Z' which is driven by a clockwork mechanism not illustrated in the drawing. During the rocking of the prism the various colours of the spectrum formed are brought to bear on the photo cell P. After amplification of the photocurrent by the amplifier indicated at V, the partial currents corresponding to the partial intensities are led by the leads E and E' to the registering device. By suitably forming the curved grooves, and particularly by suitably determining the several arcuate lengths of the circular sections $B_1$—$B_7$ it is also possible in this manner to allow the partial emission of different wave lengths to operate for different periods upon the photo cell P.

I claim:

1. The method of measuring, by a radiation sensitive device, the effect of radiant energy upon a body of predetermined relative sensitivities to different wave lengths of the spectrum, which comprises the following steps: projecting radiation from a source upon said body, directing the radiation away from said body upon a dispersion device and dispersing it into a spectrum, projecting the individual parts of the spectrum, for predetermined periods of operation, in turn and in quick succession upon a radiation sensitive device so as to produce in the latter currents proportional to the values of the individual amounts of radiant energy applied to it, the predetermined periods of operation of the individual wave lengths of the spectrum on the radiation sensitive device being proportional to the said predetermined relative sensitivities of the said body to different wave lengths, so that the sum of the partial intensities of the radiation upon the said sensitive device, which corresponds directly to the effect produced by them upon said body, may be measured, and summing up the partial currents.

2. In a system for measuring the effect of radiant energy upon a body of predetermined relative sensitivities to different wave lengths of the spectrum, a source of radiant energy to which said body is exposed, a dispersion device adapted to disperse into a spectrum the radiant energy reflected by said body, a device sensitive to radiation and adapted to translate the latter into electric currents, means for projecting in turn and in quick succession individual parts of the spectrum upon said sensitive device to produce in the latter currents proportional to the values of the individual amounts of radiant energy applied to it, regulating means interposed between the said sensitive device and the projecting means for regulating the periods of time during which said sensitive device is exposed to the individual wave lengths of the spectrum, said periods being directly proportional to the relative sensitivities of said body, and means for summing up the partial currents.

3. In a system according to claim 2 and in which said regulating means comprise a rotating slotted plate through which the individual wave lengths are admitted to the said radiation sensitive device.

4. In a system according to claim 2 and in which said regulating means comprise a slotted plate, said slots being of different size and disposed at varying distances from the center of the said plate the individual wave lengths passing through said slots to the said radiation sensitive device.

5. A system as claimed in claim 2, in which said means for regulating the periods of operation comprises a cam.

6. A system as claimed in claim 2, in which said regulating means comprise a support for movably supporting the said dispersion device and cam means for imparting a predetermined movement to the said support.

7. A system as claimed in claim 2, in which said dispersion device comprises a prism, and the said regulating means comprise a movable support for said dispersion device, a guide pin for said support, and rotary means provided with a cam groove adapted to receive said guide pin for actuating said support.

8. The method of measuring, by energy translating means, the effect of composite radiation upon a body, which comprises the following steps: ascertaining the relative sensitivities of said body to individual spectral components of said radiation, subjecting the body to the radiation, directing said radiation away from said body and dispersing the same into its spectral components, separately directing the said individual spectral components to the said means to separately subject the latter to the energy radiated by each individual component, and exposing the said means to the respective energies of the said individual spectral components for periods of time directly proportional to the said ascertained relative sensitivities of said body to said individual spectral components, and summing up the individual amounts of energy translated by the said means.

9. The method of measuring, by energy translating means, the effect of composite radiation upon a body, which comprises the following steps: ascertaining the relative sensitiveness of said body to individual spectral components of said radiation, subjecting the body to the radiation, directing said radiation away from said body and dispersing the same into its spectral components, separately directing the said individual spectral components to the said means to separately subject the latter to the energy radiated by each individual component, and exposing the said means to the respective energies of the said individual spectral components for periods of time directly proportional to the said ascertained relative sensitivities of said body to said individual spectral components, and proportional to the relative sensitivities of the said means to the individual spectral components, and summing up the individual amounts of energy translated by the said means.

10. The method of measuring, by energy translating means, the effect of composite radiation upon a body of predetermined relative sensitivities to different spectral components of such radiation, which comprises the following steps: subjecting the body to the radiation and directing the same upon a dispersion device for dispersing the radiation into its spectral components, separately directing the individual spectral components to the said means to separately subject the latter to the energy radiated by each individual spectral component, and exposing the said means to the respective energies of said individual spectral components for periods of time directly proportional to the said predetermined relative sensitivities of the said body to the different spectral components, and summing up the individual amounts of energy translated by the said means.

11. The method of measuring, by energy translating means, the effect of composite radiation upon a body of predetermined relative sensitivities to different spectral components of such radiation, which comprises the following steps: subjecting the body to the radiation, directing the radiation away from said body and dispersing the radiation into its spectral components, successively directing the respective spectral components to the said means to separately subject the latter to the energy radiated by each individual spectral component, and exposing the said means to the respective energies of said individual spectral components for periods of time directly proportional to the said predetermined relative sensitivities of the said body to the different spectral components, and summing up the individual amounts of energy translated by the said means.

12. The method of measuring, by energy translating means, the effect of composite radiation upon a body of predetermined relative sensitivities to different spectral components of such radiation, which comprises the following steps: subjecting the body to the radiation and directing the same upon a dispersion device for dispersing the radiation into its spectral components, projecting the individual parts of the spectrum in turn and in quick succession upon the said means to separately subject the latter to the energy radiated by each individual spectral component, and exposing the said means to the respective energies of said individual spectral components for periods of time directly proportional to the said predetermined relative sensitivities of the said body to the different spectral components, and summing up the individual amounts of energy translated by the said means.

13. The system claimed in claim 2, in which the said regulating means comprise a rotating slotted plate, the number of slots provided therein corresponding to the number of different wave lengths contained in the radiation to be analyzed.

14. The system claimed in claim 2, in which the said regulating means comprise a rotating plate provided with a plurality of slots of different size and position on the said plate, and control means for selectively including and excluding the said slots from operation, each of said slots serving to admit a ray of different wave length to the said sensitive device.

KARL HEINRICH MEIER.